United States Patent
Haddad et al.

(10) Patent No.: US 12,470,095 B2
(45) Date of Patent: Nov. 11, 2025

(54) ELECTRIC MACHINE STATOR WITH DAMPING MATERIAL CHANNELS

(71) Applicant: FCA US LLC, Auburn Hills, MI (US)

(72) Inventors: Reemon Zaki Saleem Haddad, Rochester Hills, MI (US); Dhafar Al-Ani, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 252 days.

(21) Appl. No.: 17/987,410

(22) Filed: Nov. 15, 2022

(65) Prior Publication Data

US 2024/0162762 A1    May 16, 2024

(51) Int. Cl.
    *H02K 1/18*    (2006.01)
    *H02K 1/20*    (2006.01)

(52) U.S. Cl.
    CPC .............. *H02K 1/185* (2013.01); *H02K 1/20* (2013.01)

(58) Field of Classification Search
    CPC ...................................................... H02K 1/185
    See application file for complete search history.

(56) References Cited

U.S. PATENT DOCUMENTS

| 7,143,503 | B2 | 12/2006 | Ionel et al. |
| 8,330,317 | B2 | 12/2012 | Burch et al. |
| 10,693,336 | B2 | 6/2020 | Deng |
| 2012/0104879 | A1 | 5/2012 | Ramu |
| 2013/0002060 | A1 | 1/2013 | Moller et al. |
| 2018/0287436 | A1 | 10/2018 | Xu et al. |
| 2021/0111598 | A1* | 4/2021 | Yu .............................. H02K 5/24 |
| 2021/0111606 | A1 | 4/2021 | Yu et al. |
| 2022/0045560 | A1* | 2/2022 | Wolf ....................... H02K 1/185 |
| 2022/0190662 | A1* | 6/2022 | Wan ........................ H02K 1/146 |

FOREIGN PATENT DOCUMENTS

| CN | 114256998 | A | * | 3/2022 | | |
| EP | 1515417 | A2 | * | 3/2005 | .............. | H02K 1/20 |
| EP | 3806290 | A1 | | 4/2021 | | |
| FR | 2975240 | A1 | * | 11/2012 | ............. | H02K 1/185 |

OTHER PUBLICATIONS

Fang (CN 114256998 A) English Translation (Year: 2022).*
Desharnais (FR 2975240 A1) English Translation (Year: 2012).*
Schulz (EP 1515417 A2) English Translation (Year: 2005).*

* cited by examiner

*Primary Examiner* — Tulsidas C Patel
*Assistant Examiner* — Robert E Mates
(74) *Attorney, Agent, or Firm* — Jeremy J. Klobucar

(57) ABSTRACT

A stator assembly for an electric machine includes a plurality of stator laminations arranged in a stacked configuration and a plurality of apertures formed in each of the stator laminations. The plurality of apertures of the plurality of stator laminations are aligned to form a plurality of channels in the stacked configuration. A damping material is disposed in at least one channel of the plurality of channels to increase stiffness in the stacked configuration and reduce noise/vibration/harshness (NVH) in the electric machine.

8 Claims, 6 Drawing Sheets

ELECTRIC MACHINE STATOR WITH DAMPING MATERIAL CHANNELS

FIELD

The present application generally relates to electric machine stators and, more particularly, to an electric machine stator assembly with improved noise/vibration/harshness (NVH) characteristics.

BACKGROUND

Electric machines typically include a stator or rotor with windings formed by thin round or rectangular hairpin, individual copper wires. One type of electric machine is an electric traction motor, which can be utilized in electrified vehicles for both propulsion and as generators for energy recapture during braking. However, NVH is one of the main design challenges and design critical parameters for electric machines, particularly in battery electric vehicle (BEV) applications, since internal combustion engine masking sounds are no longer present. Known solutions include acoustic covers, modified housing ribs, stator winding wax, and acoustic shields. However, such solutions may be complex, costly, and present packaging and weight challenges. Accordingly, while such systems work well for their intended purpose, there exists an opportunity for improvement in the relevant art.

SUMMARY

According to one example aspect of the invention, a stator assembly for an electric machine is provided. In one exemplary implementation, the stator assembly includes a plurality of stator laminations arranged in a stacked configuration and a plurality of apertures formed in each of the stator laminations. The plurality of apertures of the plurality of stator laminations are aligned to form a plurality of channels in the stacked configuration. A damping material is disposed in at least one channel of the plurality of channels to increase stiffness in the stacked configuration and reduce noise/vibration/harshness (NVH) in the electric machine.

In addition to the foregoing, the described stator assembly may include one or more of the following features: wherein each stator lamination is generally annular and includes a plurality of stator teeth extending radially inward from a back iron; wherein the plurality of apertures are formed in the back iron, and wherein slots are defined between adjacent stator teeth, the slots configured to receive coil windings; wherein the apertures of the plurality of apertures are arranged circumferentially on each stator lamination; wherein the plurality of apertures includes a first portion of apertures and a second portion of apertures; and wherein the first portion of apertures is arranged circumferentially on each stator lamination, and wherein the second portion of apertures is arranged circumferentially on each stator lamination in a location radially inward of the first portion of apertures.

In addition to the foregoing, the described stator assembly may include one or more of the following features: wherein the damping material is disposed in all channels of the plurality of channels; wherein at least one channel of the plurality of channels is a fluid channel configured to receive a flow of coolant fluid for cooling of the stator assembly; wherein the plurality of apertures is arranged circumferentially on each stator lamination, and wherein the channels formed by the circumferentially arranged apertures alternate, in a circumferential direction, between being filled with the damping material, and being open to receive a flow of coolant fluid for cooling the stator assembly; and wherein the circumferentially arranged plurality of channels includes a first plurality of channels and a second plurality of channels, and wherein the second plurality of channels is disposed radially inward of the first plurality of channels.

In addition to the foregoing, the described stator assembly may include one or more of the following features: wherein the channels formed by the first portion of apertures include the damping material disposed therein, and wherein the channels formed by the second portion of apertures are configured to receive a flow of coolant fluid for cooling the stator assembly; wherein the channels formed by the first portion of apertures are configured to receive a flow of coolant fluid for cooling the stator assembly, and wherein the channels formed by the second portion of apertures include the damping material disposed therein; and wherein the second portion of apertures, which are disposed radially inward of the first portion of apertures, are present, in a circumferential direction, every other aperture of the first portion of apertures.

In addition to the foregoing, the described stator assembly may include one or more of the following features: wherein the first portion of apertures, which are disposed radially outward of the second portion of apertures, are present, in a circumferential direction, every other aperture of the second portion of apertures; wherein the apertures of the second portion of apertures are disposed, in a radial direction, between adjacent apertures of the first portion of apertures; wherein the first portion of apertures are filled with the damping material, and the second portion of apertures are configured to receive a flow of coolant fluid for cooling the stator assembly; and wherein the first portion of apertures are configured to receive a flow of coolant fluid for cooling the stator assembly, and the second portion of apertures are filled with the damping material.

According to another example aspect of the invention, a method of manufacturing a stator assembly for an electric machine is provided. In one implementation, the method includes providing a plurality of stator laminations, forming each stator lamination of the plurality of stator laminations with a plurality of apertures, and arranging the stator laminations of the plurality of stator laminations in a stacked configuration with the plurality of apertures of each stator lamination aligned, to thereby form a plurality of channels in the stacked configuration. The method further includes disposing a damping material in at least one channel of the plurality of channels to increase stiffness in the stacked configuration and reduce noise/vibration/harshness (NVH) in the electric machine.

In addition to the foregoing, the described method may include one or more of the following features: forming each stator lamination as generally annular and including a plurality of stator teeth extending radially inward from a back iron, and forming a plurality slots between adjacent stator teeth, the slots configured to receive coil windings; and wherein the plurality of apertures of each stator lamination includes a first portion of apertures and a second portion of apertures, and circumferentially arranging the first portion of apertures on each stator lamination, and circumferentially arranging the second portion of apertures on each stator lamination in a location radially inward of the first portion of apertures.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Described herein are systems and methods for manufacturing electric machines, such as electric traction motors, with an improved stator assembly design to reduce or eliminate NVH. The stator is assembled from a plurality of steel laminations each formed with a plurality of channels on the stator back-iron region during a manufacturing process such as die punching, laser cutting, 3D printing, etc. In some embodiments, the channels are configured to receive a coolant (e.g., oil) therethrough to provide cooling to the stator and electric machine. In other embodiments, the channels are filled with a high damping material, which is configured to increase overall electric machine stiffness, and suppress/dampen the harmonics orders generated in the machine.

As a result, overall NVH orders are advantageously minimized, thereby improving the NVH performance of the electric machine and associated electric drive module (EDM). The number and shape of the channels can be varied based on a number of factors including, but not limited to, electric machine design requirements, available space of the stator back-iron, cooling requirements, thermal and electromagnetic performance requirements, properties of the damping material, and the amount of required NVH minimization.

Figure 1:
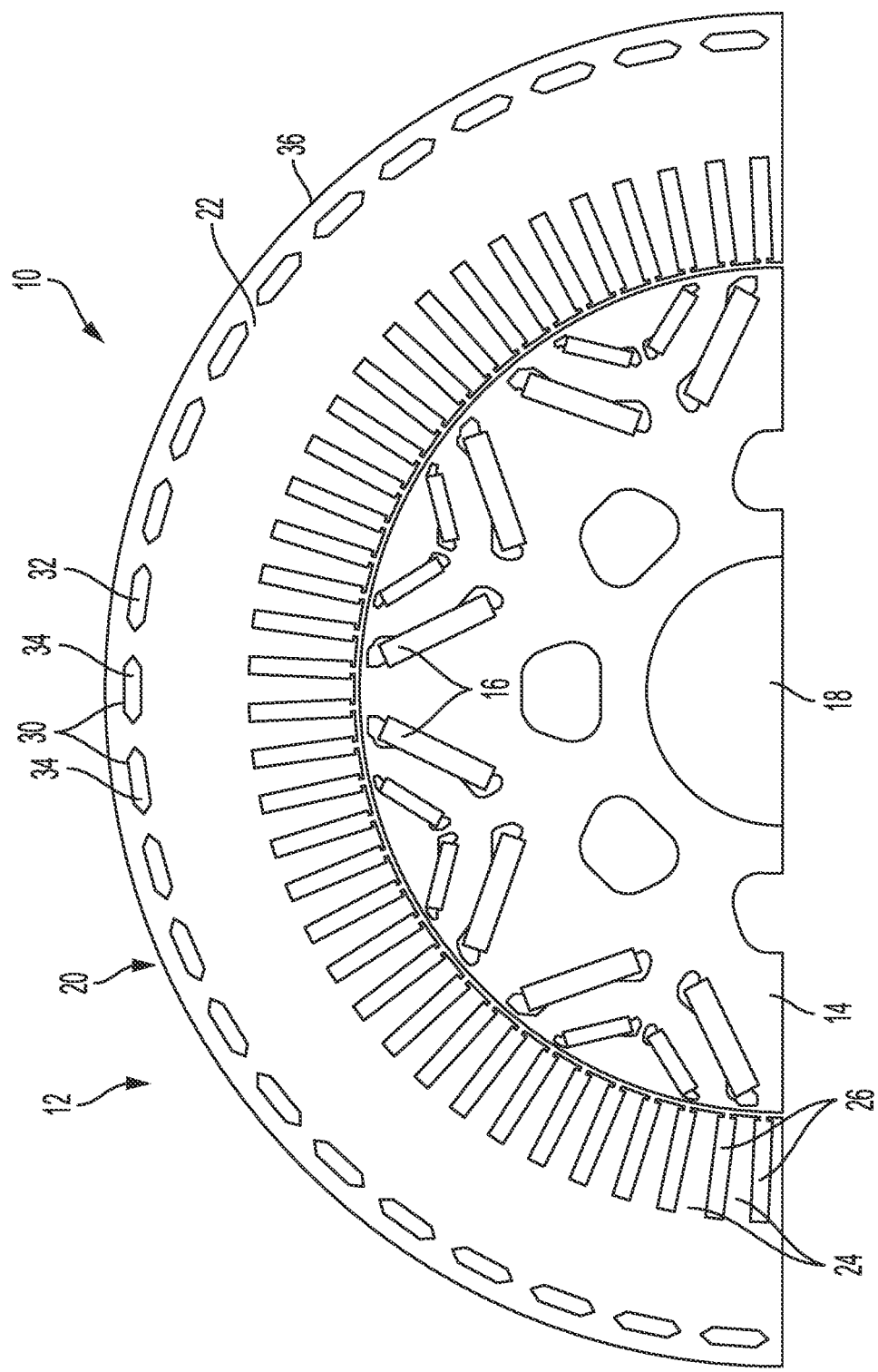
FIG. 1 is a cross-sectional view of a portion of an example electric motor for an electric vehicle, in accordance with the principles of the present application.

Referring now to FIG. 1, a portion of an example electric machine is illustrated and generally identified at reference numeral 10. In the example embodiments, the electric machine 10 is described as an electric traction motor for an electric vehicle, but it will be appreciated that the features described herein may be applied to various electric machines. In the illustrated example, the electric traction motor 10 generally includes a stator assembly 12 operably associated with a rotor 14 having a plurality of permanent magnets 16. In general, the stator assembly 12 receives electrical power to produce a magnetic field, which interacts with a magnetic field of the rotor 14 to produce mechanical power to a shaft 18.

In the example embodiment, the stator assembly 12 is formed from a plurality of individual annular stator laminations 20 (only one shown). The stator laminations 20 are stacked one on top of the other to a length known as the stack length, which determines the torque and power output of the electric machine 10. The stator laminations 20 are coupled together, for example, by gluing, interlocking, welding, or other suitable joining technique. The number of stator laminations 20 of the stack length can be based on design considerations and, as such, stator assembly 12 may have any suitable number of stator laminations 20.

In the illustrated example, each stator lamination 20 is fabricated from a magnetic steel in a punching die, laser cut, 3D printing, etc. (not shown) to produce a generally annular component (only half shown) having a back iron 22 with a plurality radially aligned teeth 24 extending radially inward from the back iron 22. The stator teeth 24 define slots 26 therebetween through which coil windings (not shown) are wound.

In the example embodiment, each stator lamination 20 is formed with a plurality of circumferentially arranged apertures 30. During assembly, the stator laminations 20 are stacked such that the apertures 30 are aligned to define a channel 32 through the stacked configuration. The channels 32 are subsequently filled with a damping material 34, for example, via injection. As a result, the overall stiffness and NVH performance of the electric machine 10 is improved. It will be appreciated that the damping material 34 may be any suitable damping material such as, for example a paste or liquid, including rubber, silica gel, lubricating grease, silicone oil, polyurethane foams, polyolefin elastomers, etc. Additionally, as shown, the apertures 30 are arranged in close proximity to an outer diameter 36 of the back iron 22 so as to advantageously not affect performance of the electric machine 10.

In another configuration, a portion of the channels 32 do not receive the damping material 34 and are instead open (e.g., unfilled) and configured to receive a flow of cooling fluid (e.g., oil, water, air) for cooling the stator assembly 12 and electric machine 10. In one example, every other channel 32 in a circumferential direction may receive the cooling fluid, while the remaining channels 32 are filled with the damping material 34.

Figure 2:
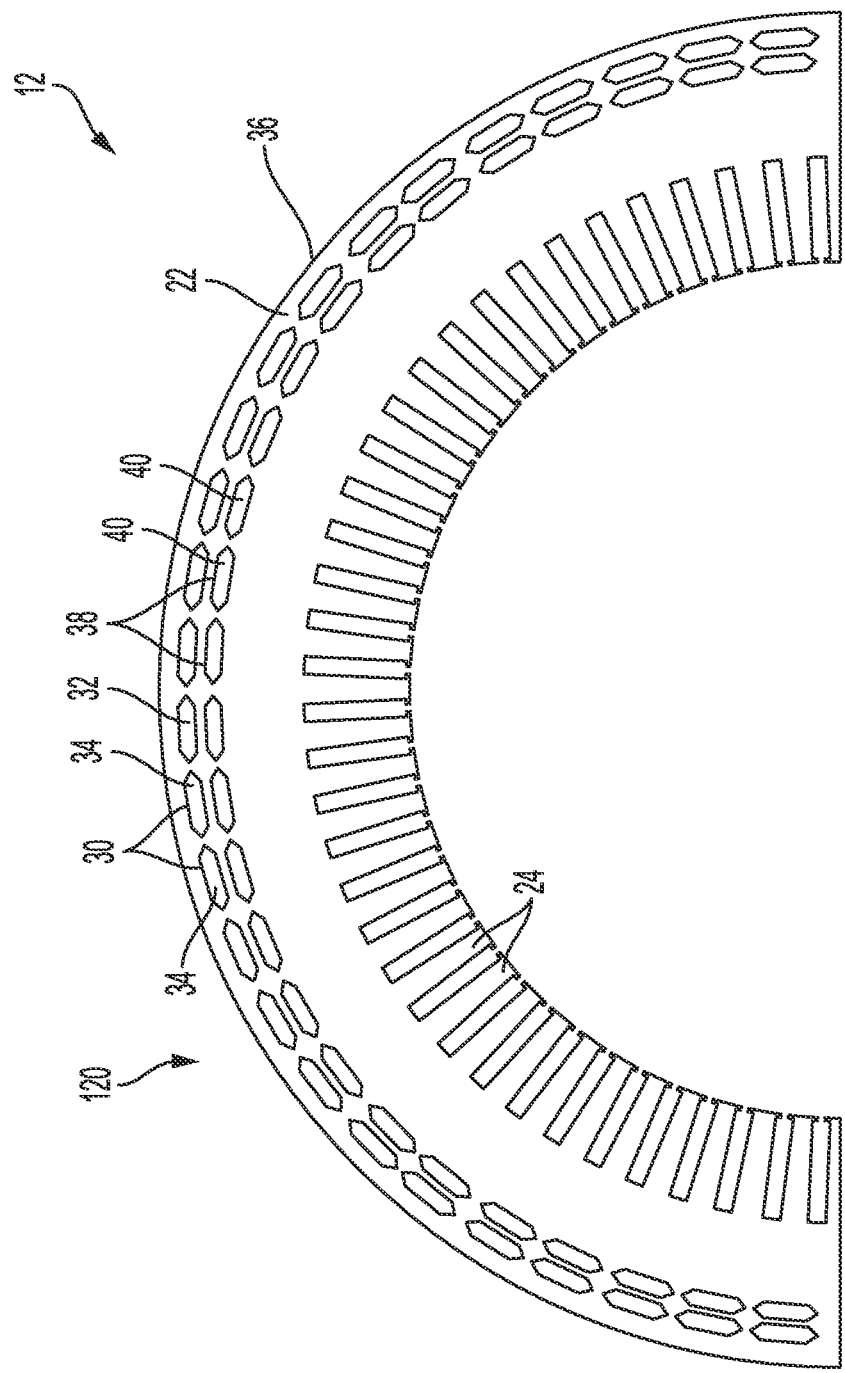
FIG. 2 is a side view of a portion of an example stator lamination that may be utilized in the electric motor of FIG. 1, in accordance with the principles of the present application.

With reference now to FIG. 2, a stator lamination 120 is illustrated. Stator lamination 120 is similar to stator lamination 20 except that it includes a second plurality of circumferentially arranged apertures 38. Like reference numerals indicate like parts. In the example embodiment, the second apertures 38 are arranged radially inward of the first apertures 30 and are configured to define a second plurality of channels 40 when the stator laminations 120 are stacked together. In this configuration, the stator assembly 12 has an equal number of first channels 32 and second channels 40. However, unlike the first channels 32 that are filled with the damping material 34, the second channels 40 are configured to receive a flow of cooling fluid (e.g., oil, water, air) for cooling the stator assembly 12 and electric machine 10.

In an alternative configuration, the first channels 32 are configured to receive the flow of cooling fluid, and the second channels 40 are filled with the damping material. In another configuration, a portion of the first channels 32 do not receive the damping material 34 and are instead configured to receive the flow of cooling fluid (e.g., oil, water, air) for cooling the stator assembly 12 and electric machine 10. In a similar manner, a portion of the second channels 40 do not receive the flow of cooling fluid and instead are filled with the damping material 34. For example, every other first channel 32 and second channel 40 in a circumferential direction may receive the cooling fluid, while the remaining channels 32, 40 are filled with the damping material 34.

Figure 3:
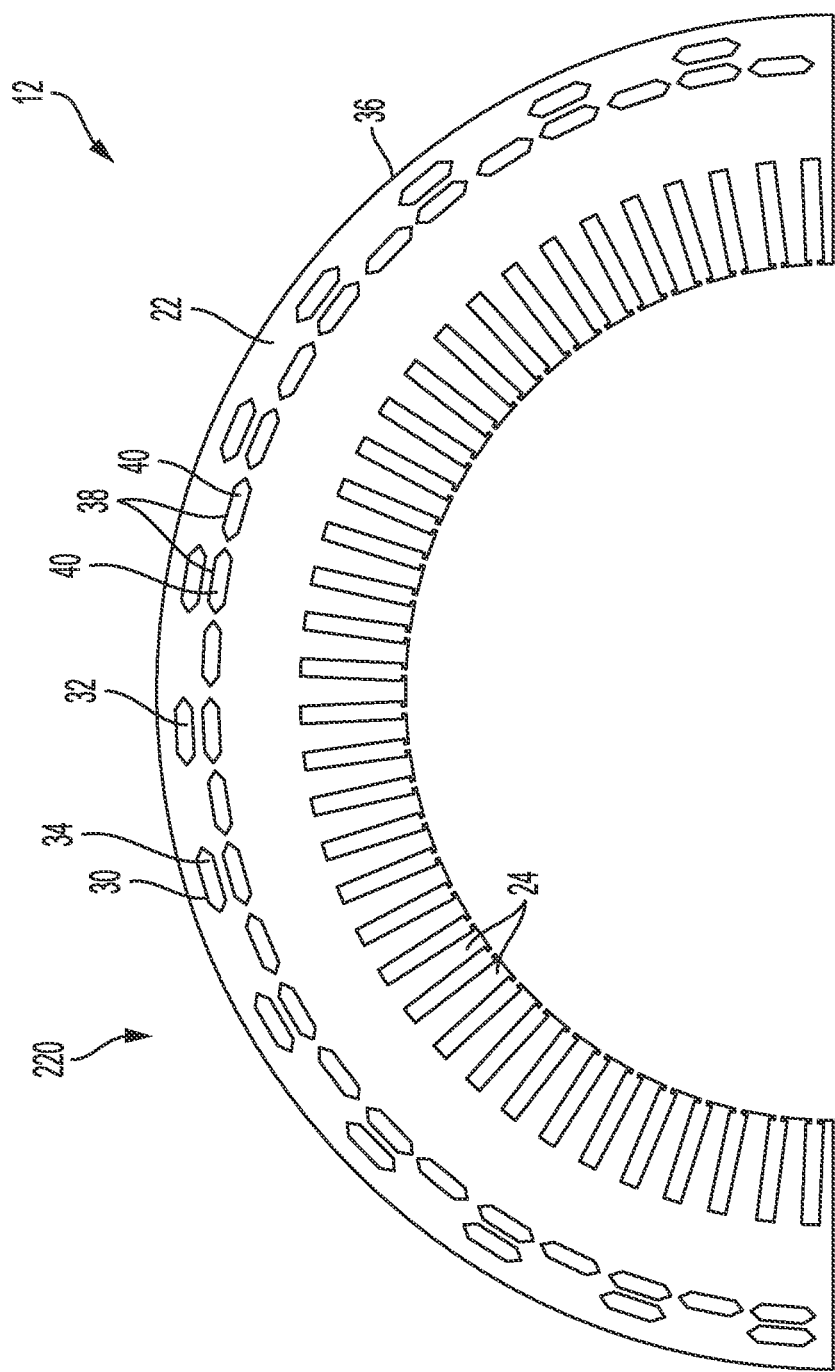
FIG. 3 is a side view of a portion of another example stator lamination that may be utilized in the electric motor of FIG. 1, in accordance with the principles of the present application.

With reference now to FIG. 3, a stator lamination 220 is illustrated. Stator lamination 220 is similar to stator lamination 120 except that the number of first channels 32 is reduced compared to the second channels 40. Like reference numerals indicate like parts. In the example embodiment, the second apertures 38 are arranged radially inward of the first apertures 30. However, in this configuration, the stator assembly 12 has half the number of first channels 32 compared to the second channels 40. In this way, first channels 32 are circumferentially arranged at every other circumferentially arranged second channel 40. In the illustrated example, the first channels 32 are filled with the damping material 34, and the second channels 40 are configured to receive a flow of cooling fluid (e.g., oil, water, air) for cooling the stator assembly 12 and electric machine 10.

In an alternative configuration, the first channels 32 are configured to receive the flow of cooling fluid, and the second channels 40 are filled with the damping material. In yet another configuration, the reduced number of channels is produced at the second channels 40 such that second channels 40 are circumferentially arranged at every other circumferentially arranged first channel 32. In such a configuration, the first channels 32 may be filled with the damping material 34 while the second channels 40 are configured to receive the flow of cooling fluid, or vice versa. Moreover, with other configurations in mind, it will be appreciated that the first channels 32 and the second channels 40 may be reduced in any number compared to the other (e.g., one first channel 32 every three second channels 40).

Figure 4:
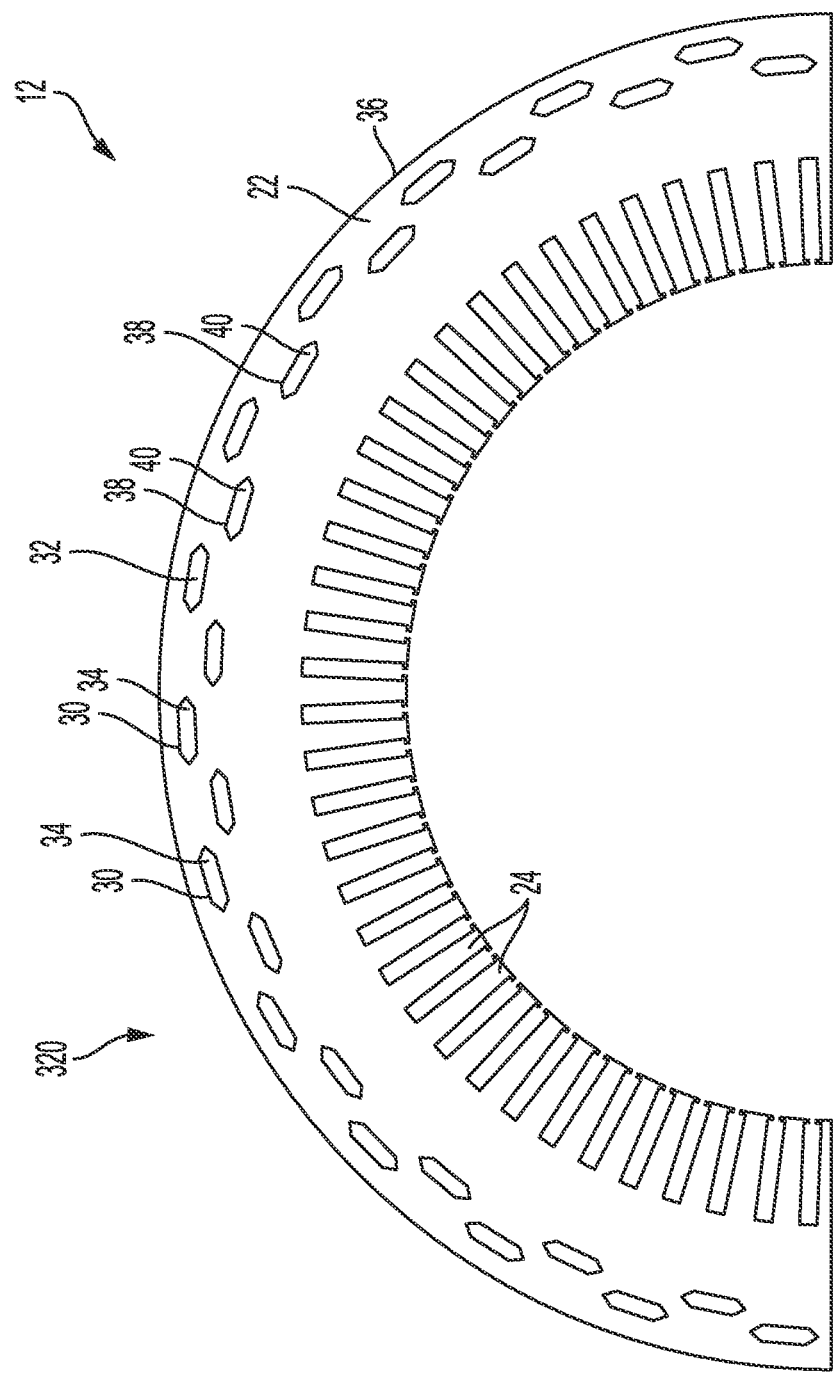
FIG. 4 is a side view of a portion of yet another example stator lamination that may be utilized in the electric motor of FIG. 1, in accordance with the principles of the present application.

With reference now to FIG. 4, a stator lamination 320 is illustrated. Stator lamination 320 is similar to stator lamination 120 except that the first channels 32 and the second channels are radially offset (e.g., not radially aligned). Like reference numerals indicate like parts. In the example embodiment, the second apertures 38 are arranged radially inward of the first apertures 30. However, in this configuration, the first channels 32 and the second channels 40 alternate in a circumferential direction. In other words, when a first channel 32 is present, a second channel 40 is not present in a radial direction, and vice versa. In the illustrated example, the first channels 32 are filled with the damping material 34, and the second channels 40 are configured to receive a flow of cooling fluid (e.g., oil, water, air) for cooling the stator assembly 12 and electric machine 10. In another configuration, the first channels 32 are configured to receive the flow of cooling fluid, and the second channels 40 receive the damping material.

Although FIGS. 1-4 and the accompanying description show/describe various patterns and configurations of some channels receiving the damping material 34 and other channels receiving the flow of cooling fluid, it will be appreciated that various other patterns and configurations of which channels receive damping material and which channels receive cooling fluid are envisioned based on various design factors such as thermal requirements and NVH requirements.

Figure 5:
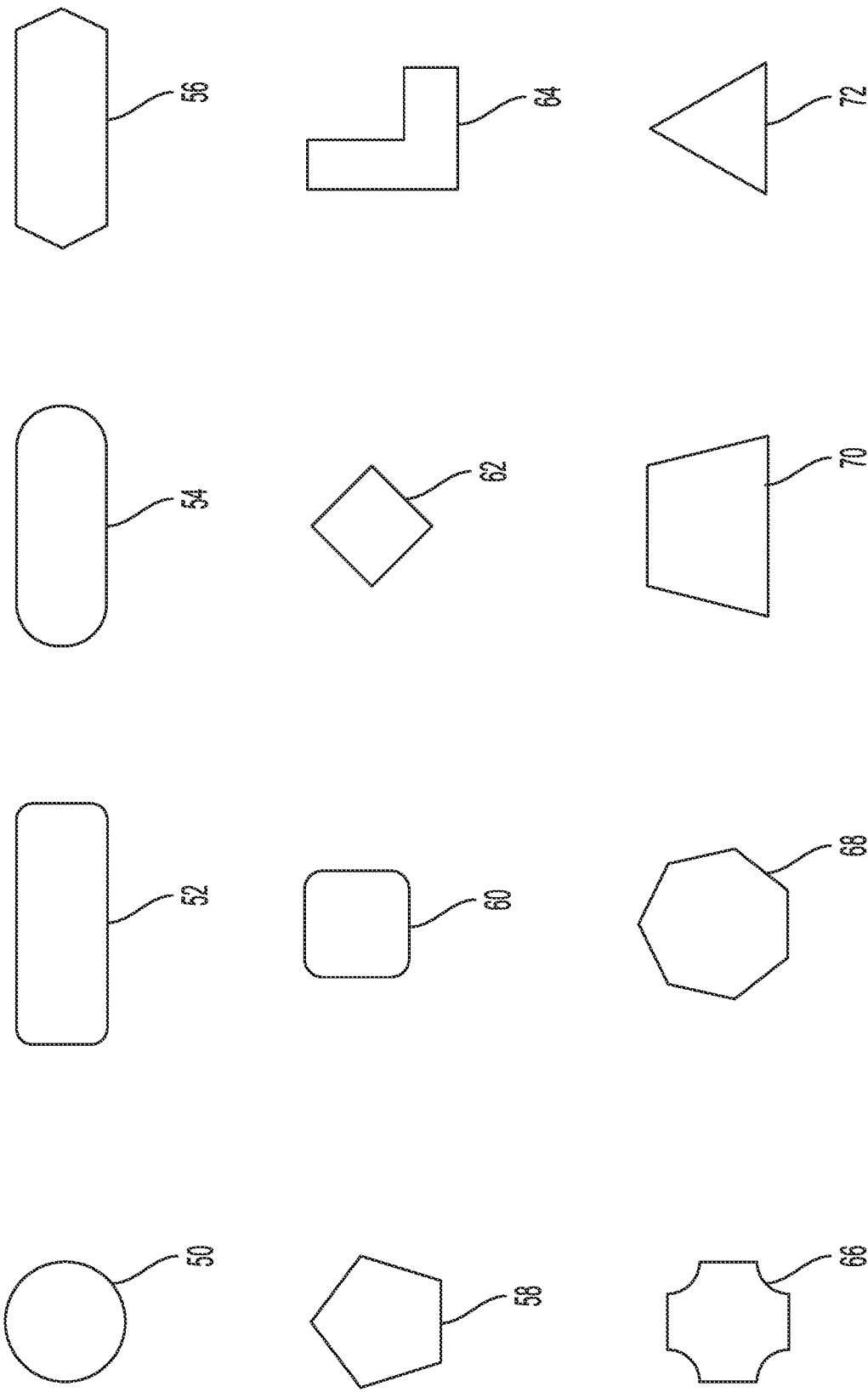
FIG. 5 illustrates various example aperture shapes that may be formed in the stator laminations shown in FIGS. 1-4, in accordance with the principles of the present application.

With reference now to FIG. 5, various alternative shapes for apertures 30, 38 and therefore channels 32, 40 are illustrated. The aperture shapes shown in FIG. 5 include a circular shape 50, a rectangular shape 52, a slot with rounded ends 54, a slot with converging ends 56 (shown in FIGS. 1-4), a pentagonal shape 58, a square shape 60, a diamond or rhombus shape 62, an L-shape or chevron shape 64, a cross shape 66, a heptagonal shape 68, a trapezoidal shape 70, and a triangular shape 72. It will be appreciated that apertures 30, 38 are not limited to the described shapes and could have various other shapes. Moreover, it will also be appreciated that each stator lamination may have various combinations of shapes.

Figure 6:
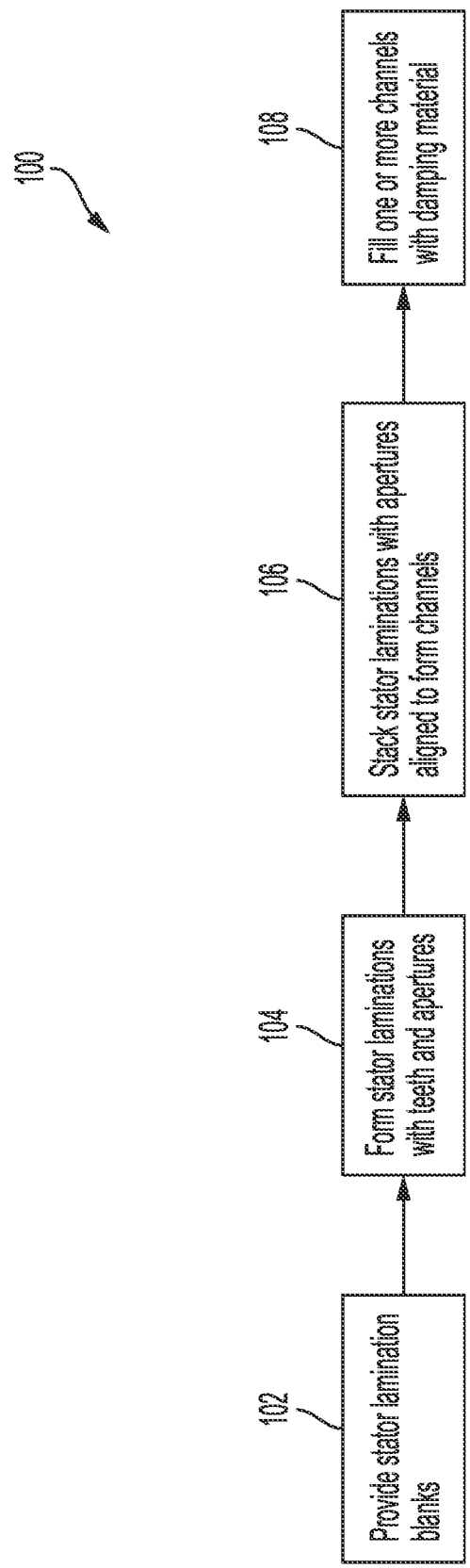
FIG. 6 illustrates an example method of forming a stator assembly that may be utilized in the electric motor of FIG. 1, in accordance with the principles of the present application.

FIG. 6 illustrates an example method 100 of manufacturing stator assembly 12. The method begins at step 102 where a plurality of stator lamination blanks are provided. At step 104, each stator lamination blank is processed and formed with stator teeth 24 and apertures 30 (and optionally 38) in the back iron 22 to produce the stator lamination 20, x20. In the example embodiment, the stator laminations 20, x20 are formed in a die press operation. At step 106, the stator laminations 20, x20 are stacked and coupled end to end with the apertures 30 (and optionally 38 if present) aligned to form channels 32 (and optionally 40). At step 108, one or more channels 32 (and optionally 40 if present) are filled with damping material 34.

Described herein are systems and methods for manufacturing electric machines, such as electric traction motors, with an improved stator assembly design to reduce or eliminate NVH. The stator is assembled from a plurality of steel laminations each formed with a plurality of apertures configured to align and define channels on the stator back-iron region. The channels are configured to receive a damping material to reduce NVH, or receive a coolant fluid to provide cooling to the stator and electric machine. This advantageously increases overall electric machine stiffness, suppresses/dampens NVH, and/or provides cooling to the electric machine, thereby improving the NVH performance of the electric machine and associated electric drive module (EDM). The number and shape of the channels can be varied based on a number of factors.

The example embodiments of the invention have been explained by way of example with reference to a stator of an electric machine. It will be appreciated, however, that the designs described here are also suitable for a rotor of an electric machine.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A stator assembly for an electric machine, the stator assembly comprising:
   a plurality of stator laminations arranged in a stacked configuration, wherein each stator lamination is generally annular and includes a plurality of stator teeth extending radially inward from a back iron;

a plurality of evenly spaced apertures formed in each of the stator laminations, wherein the plurality of apertures of the plurality of stator laminations are aligned to form a plurality of channels in the stacked configuration; and a damping material disposed in at least one channel of the plurality of channels and configured to increase stiffness in the stacked configuration and reduce noise/vibration/harshness (NVH) in the electric machine, wherein the apertures of the plurality of apertures are formed in the back iron and arranged circumferentially along an outer diameter of the back iron, wherein the plurality of apertures includes a first portion of apertures and a second portion of apertures, wherein the first portion of apertures is arranged circumferentially on each stator lamination, wherein the second portion of apertures is arranged circumferentially on each stator lamination in a location radially inward of the first portion of apertures, wherein the channels formed by the first portion of apertures are configured to receive a flow of coolant fluid for cooling the stator assembly, and wherein the channels formed by the second portion of apertures include the damping material disposed therein.

2. The stator assembly of claim 1, wherein the second portion of apertures, which are disposed radially inward of the first portion of apertures, are present, in a circumferential direction, every other aperture of the first portion of apertures.

3. The stator assembly of claim 1, wherein the first portion of apertures, which are disposed radially outward of the second portion of apertures, are present, in a circumferential direction, every other aperture of the second portion of apertures.

4. The stator assembly of claim 1, wherein the apertures of the second portion of apertures are inwardly disposed, in a radial direction, between adjacent apertures of the first portion of apertures.

5. The stator assembly of claim 1, wherein each aperture of the plurality of apertures has the same orientation along the circumferential arrangement.

6. The stator assembly of claim 1, wherein each aperture of the plurality of apertures has the same shape.

7. A stator assembly for an electric machine, the stator assembly comprising:
a plurality of stator laminations arranged in a stacked configuration;
a plurality of apertures formed in each of the stator laminations, wherein the plurality of apertures of the plurality of stator laminations are aligned to form a plurality of channels in the stacked configuration; and
a damping material disposed in at least one channel of the plurality of channels and configured to increase stiffness in the stacked configuration and reduce noise/vibration/harshness (NVH) in the electric machine,
wherein the plurality of apertures includes a first portion of apertures and a second portion of apertures,
wherein the first portion of apertures is arranged circumferentially on each stator lamination, and
wherein the second portion of apertures is arranged circumferentially on each stator lamination in a location radially inward of the first portion of apertures,
wherein the apertures of the second portion of apertures are disposed, in a radial direction, between adjacent apertures of the first portion of apertures, and
wherein the first portion of apertures are configured to receive a flow of coolant fluid for cooling the stator assembly, and the second portion of apertures are filled with the damping material.

8. A method of manufacturing a stator assembly for an electric machine, the method comprising:
providing a plurality of stator laminations, wherein each stator lamination is generally annular and includes a plurality of stator teeth extending radially inward from a back iron;
forming each stator lamination of the plurality of stator laminations with a plurality of evenly spaced apertures, wherein the apertures of the plurality of apertures are formed in the back iron and arranged circumferentially along an outer diameter of the back iron;
arranging the stator laminations of the plurality of stator laminations in a stacked configuration with the plurality of apertures of each stator lamination aligned, to thereby form a plurality of channels in the stacked configuration; and
disposing a damping material in at least one channel of the plurality of channels to increase stiffness in the stacked configuration and reduce noise/vibration/harshness (NVH) in the electric machine,
wherein the plurality of apertures includes a first portion of apertures and a second portion of apertures,
wherein the first portion of apertures is arranged circumferentially on each stator lamination,
wherein the second portion of apertures is arranged circumferentially on each stator lamination in a location radially inward of the first portion of apertures,
wherein the channels formed by the first portion of apertures are configured to receive a flow of coolant fluid for cooling the stator assembly, and
wherein the channels formed by the second portion of apertures include the damping material disposed therein.

* * * * *